A. W. SMITH.
Horseshoes.
No. 207,905.  Patented Sept. 10, 1878.
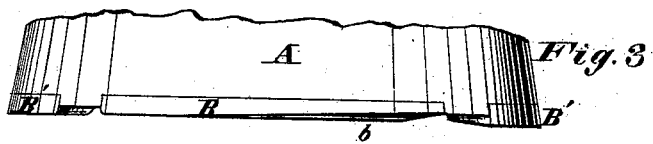
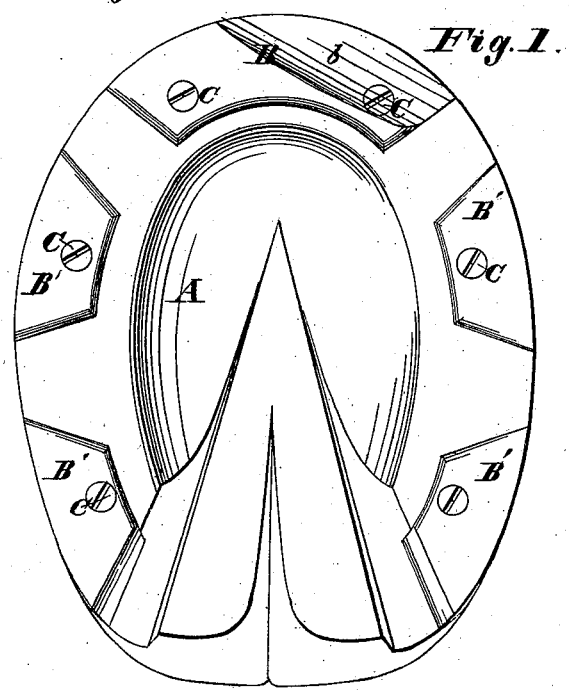
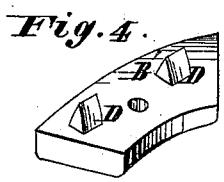
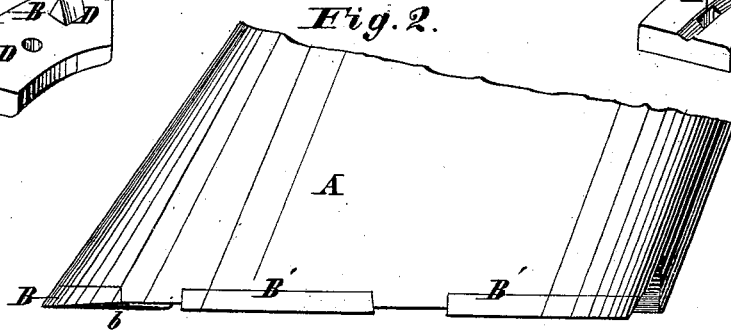
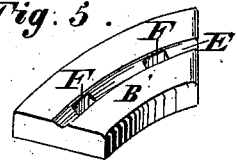
WITNESSES
Chas. J. Gooch
Le Blond Burdett
INVENTOR
Aaron W. Smith
by Knight Bros, Attorneys

UNITED STATES PATENT OFFICE.

AARON W. SMITH, OF MANCHESTER, N. H., ASSIGNOR OF ONE-FOURTH OF HIS RIGHT TO WARREN McFARLAND, OF WORCESTER, MASS.

IMPROVEMENT IN HORSESHOES.

Specification forming part of Letters Patent No. 207,905, dated September 10, 1878; application filed May 7, 1877.

*To all whom it may concern:*

Be it known that I, AARON W. SMITH, of Manchester, in the county of Hillsborough and State of New Hampshire, have invented certain new and useful Improvements in Horseshoes, of which the following is a specification:

This invention consists in forming the shoe in sections, which are attached to the hoof, independently of each other, by screws or by nails, in the usual manner. The sections are further provided with rigid studs projecting from the upper surface, (where they come in contact with the hoof,) said studs entering the hoof, so as to secure the shoe-sections from lateral movement.

The invention further consists in constructing the toe-section with a lateral slope or bevel, extending outward from near the center, for the purpose of spreading the gait of the horse, as hereinafter explained.

In the accompanying drawing, Figure 1 is an under-side view of the hoof with my invention applied. Fig. 2 is a side view of the same. Fig. 3 is a front view of the lower portion of the hoof, illustrating the lateral beveling of the toe-section. Fig. 4 is a perspective view of one of the shoe-sections, showing the upper surface, or that which comes in contact with the hoof. In the above views the invention is represented as used with screws for attaching the shoe-sections. Fig. 5 is a perspective view of one of the shoe-sections, showing the under or exposed surface, and illustrating a modification of the invention adapting the shoe-section for attachment by means of nails, in the usual manner.

A represents the hoof of a horse, and B B' segmental shoe-sections. C C are screws for attaching the same. D D are studs projecting from the upper surface of the shoe-sections. The said studs have preferably the represented flat wedge-like shape, and are adapted to enter the horny part of the hoof, so as to secure the shoe-section against horizontal movement, while the screws C keep it firmly in contact with the hoof. Calks may, if desired, be formed on the under surface of the shoe-sections in any usual manner.

In practice, I prefer to form the toe-section B of greater length than the others, and to construct it with a bevel, $b$, extending from near the center to the outside of the foot. This causes the foot to tilt toward the outside at each step, and gives the animal a wider action or gait. Two or more of the shorter sections B', as may be necessary, are applied at each side of the hoof.

If preferred, the shoe-sections may be provided with the customary countersink E and nail-holes F, as illustrated in Fig. 5, to adapt them for attachment to the hoof by nailing.

My invention is of great utility in providing an effective means for shoeing without any constraint on the hoof, leaving it free to grow in any direction, and also to spread when subjected to the weight of the animal, and to contract when raised from the ground, as nature demands.

The invention affords perfect protection for the portions of the feet which are exposed to wear and violence and are naturally rigid and insensible, and it permits the frog and elastic or cushion portion of the hoof to come in contact with the ground.

The shoe-sections may be applied on the surface of the hoof so as to project therefrom, or they may be let in so as to come flush, or nearly so, with the surface of the hoof.

Having thus described my invention, the following is what I claim as new therein and desire to secure by Letters Patent:

1. The independent shoe-sections B B', constructed and applied substantially as and for the purpose set forth.

2. The construction of the toe-section B with a bevel, $b$, extending from the center outwardly, as and for the purpose set forth.

AARON W. SMITH.

Witnesses:
ISAAC ROATH,
E. R. GATES.